June 16, 1925. Re. 16,096

F. C. BIGGERT, JR

ROLLING MILL

Original Filed Sept. 8, 1922 3 Sheets-Sheet 1

INVENTOR

Florence C. Biggert, Jr.

By Byrne, Barrett & Parmelee his attys.

June 16, 1925.

Re. 16,096

F. C. BIGGERT, JR

ROLLING MILL

Original Filed Sept. 8, 1922

3 Sheets-Sheet 2.

INVENTOR

Florence C. Biggert Jr., by Rayner, Parkins & Parnelle, his atty.

June 16, 1925. Re. 16,096

F. C. BIGGERT, JR

ROLLING MILL

Original Filed Sept. 8, 1922 3 Sheets-Sheet 3

INVENTOR
Florence C. Biggert Jr.,
By Byrne, Fallon & Parmelee,
Att'ys.

Reissued June 16, 1925.

Re. 16,096

UNITED STATES PATENT OFFICE.

FLORENCE C. BIGGERT, JR., OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA.

ROLLING MILL.

Original No. 1,487,007, dated March 18, 1924, Serial No. 586,914, filed September 8, 1922. Application for reissue filed December 6, 1924. Serial No. 754,443.

*To all whom it may concern:*

Be it known that I, FLORENCE C. BIGGERT, Jr., a citizen of the United States, residing at Pittsburgh, in the county of Allegheny and State of Pennsylvania, have invented a new and useful Improvement in Rolling Mills, of which the following is a full, clear, and exact description, reference being had to the accompanying drawings, forming a part of this specification, in which—

Figure 1:
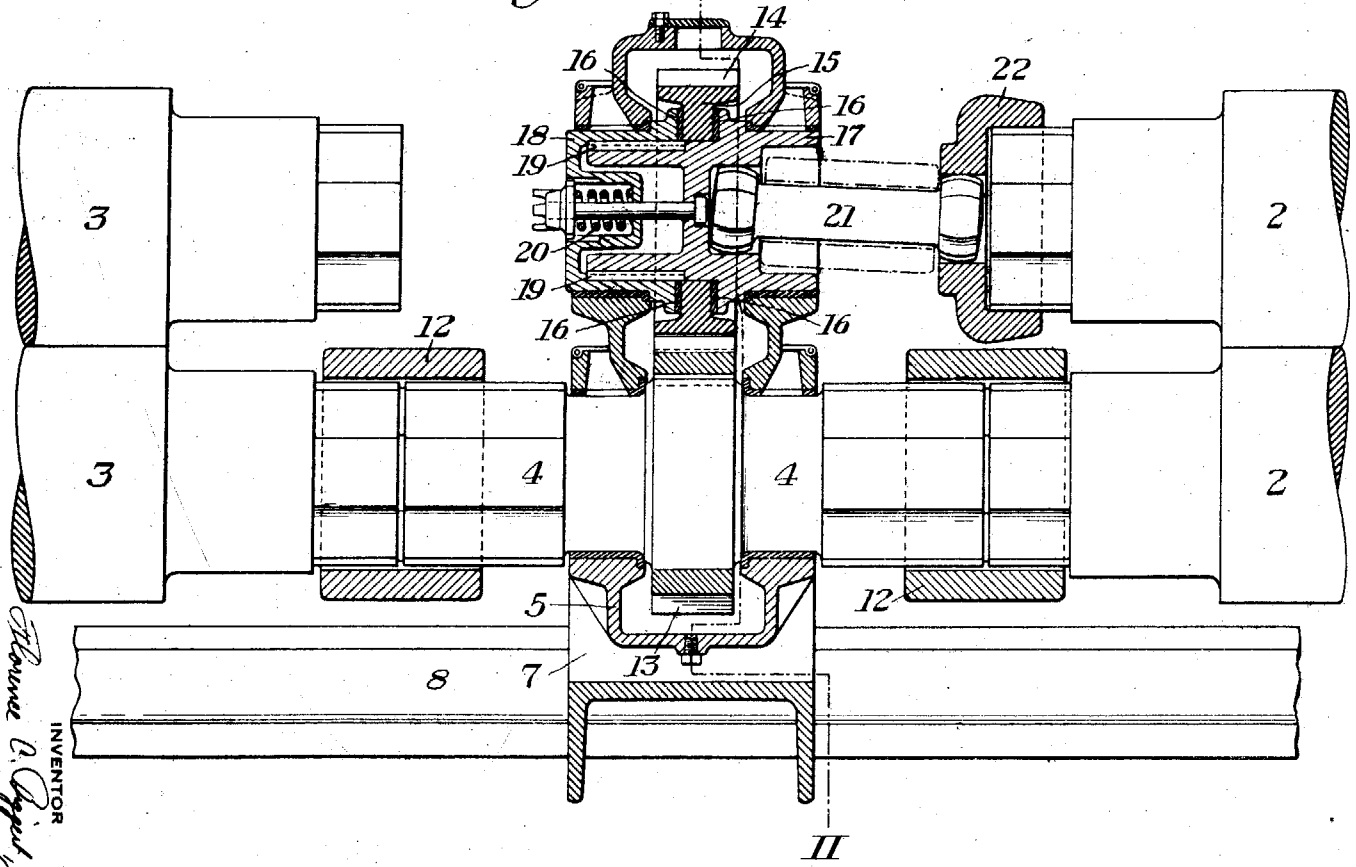
Figure 1 is a view, largely diagrammatic and partly in section, illustrating a portion of the roughing stand rolls and a portion of the finishing stand rolls.
Figure 2:
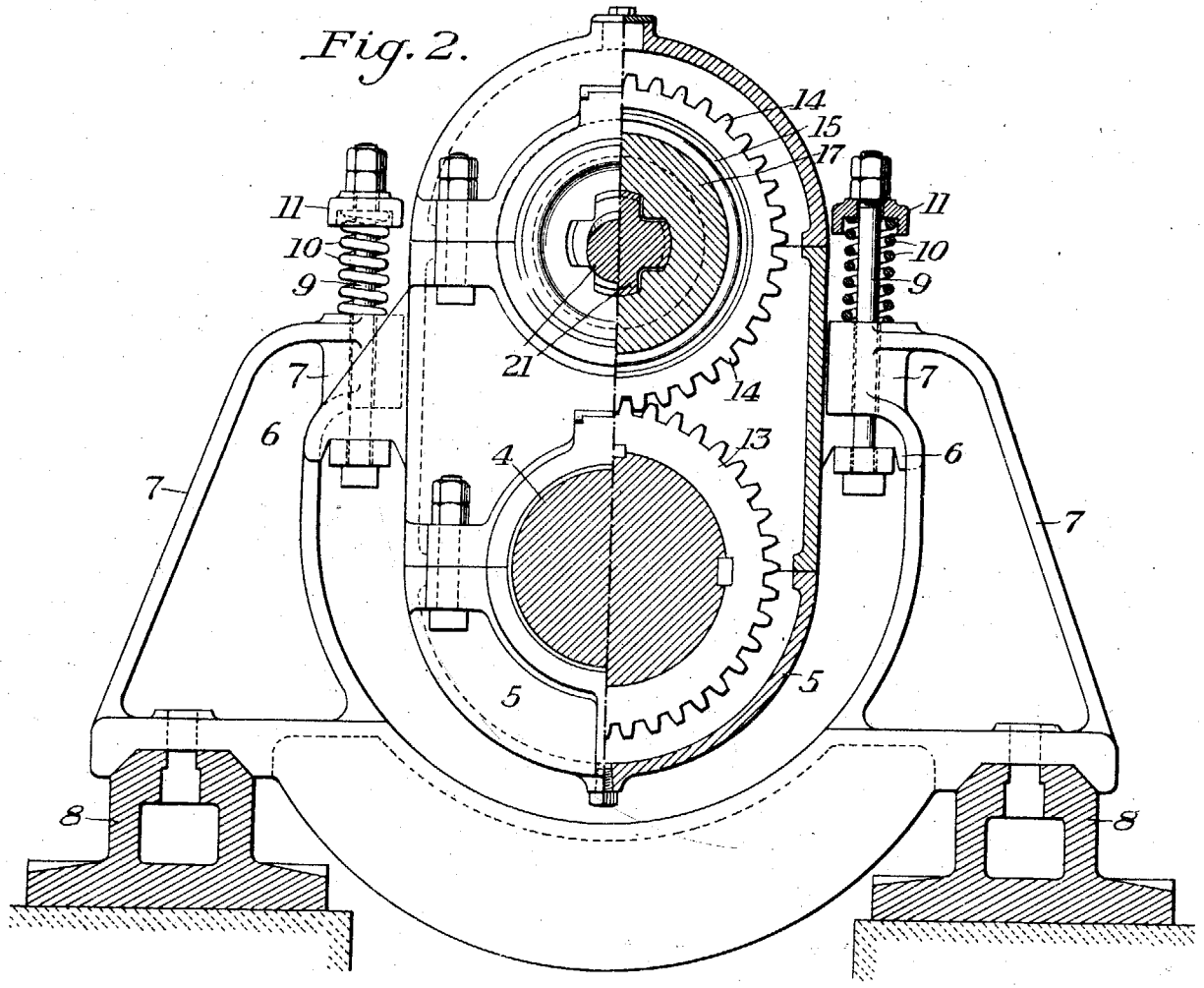
Figure 2 is a view, partly in elevation and partly in section, on the line II—II of Figure 1.
Figure 3:
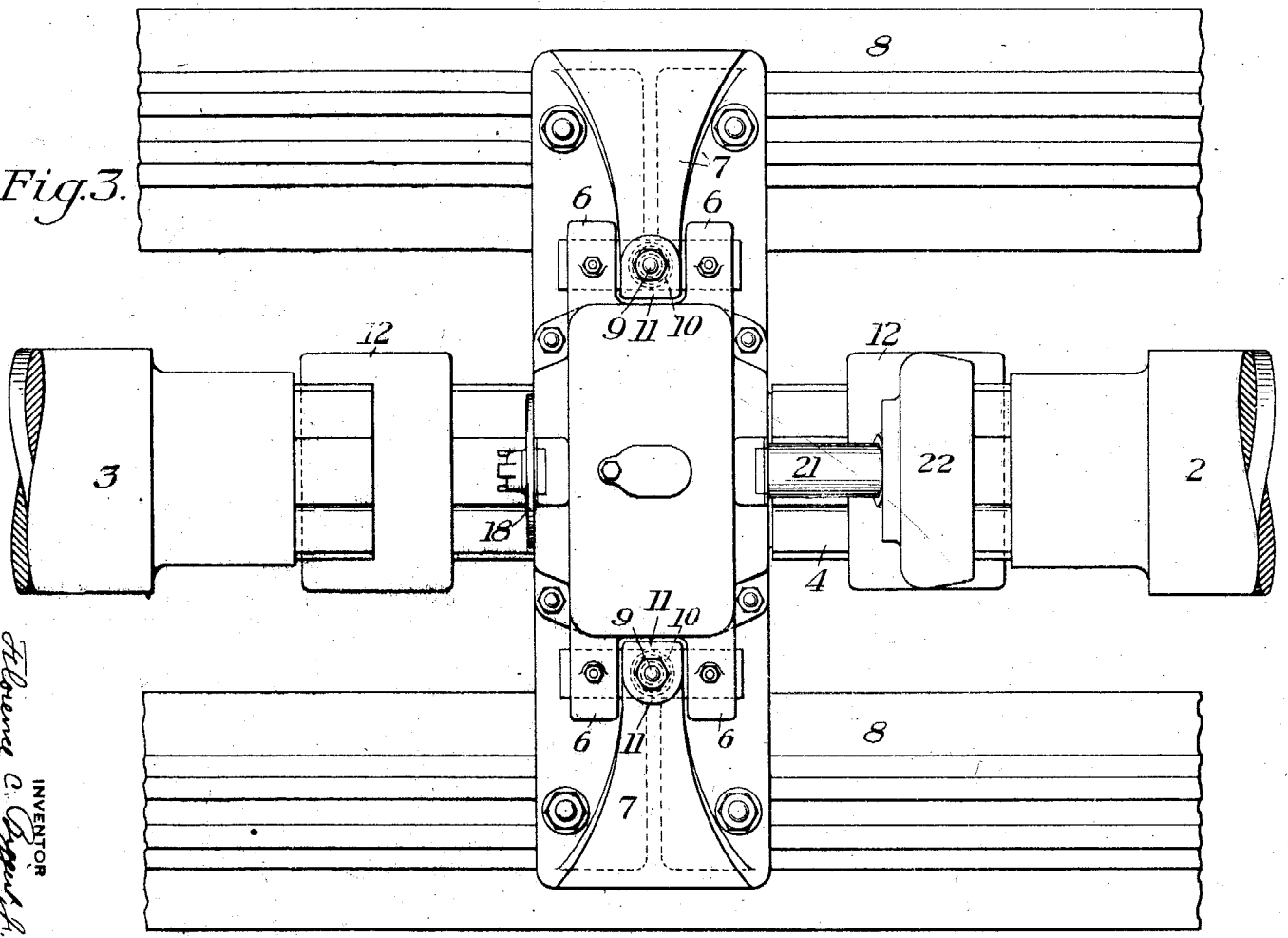
Figure 3 is a top plan view of the construction illustrated in Figure 1.

The present invention relates broadly to rolling mills, and more particularly to rolling mills of the balanced type especially adapted for the rolling of sheets.

It has heretofore been proposed in this art to construct sheet mills comprising a two-high roughing stand and a two-high finishing stand located with the rolls in end-to-end relationship. In such mills it is customary to drive the bottom rolls of both stands from one end through a suitable spindle located intermediate the roll stands and carried in a floating housing. In a 44-inch mill, for example, the distance between the center of one of the rolls in the roughing stand and the center of the corresponding roll in the finishing stand is approximately 13 feet. This distance is not so great but that it is possible for a man standing at an intermediate point with respect to the roll stands, to effect the desired transfer of material from the rolls of one stand to the rolls of the other stand.

It is desirable with such mills, however, to drive the top roll of the roughing stand in order to assist in the feeding of a sheet bar into position between the rolls. With ordinary unbalanced mills, it is not considered advisable to jump the upper roll more than three-fourths of an inch, although in some mills such rolls may be jumped as much as 1¼ inches. With balanced rolls, however, it is not uncommon to roll bars as thick as 2½ inches.

With the present invention it is possible to maintain the advantages of a balanced mill and the advantages which are derived from a positive driving of the top roll of the roughing stand, without increasing the distance between the centers of the roll stands to such an extent as to make the transfer operation an unwieldly one.

At the present time there are several different methods of effecting this type of roll drive. The most common of these methods comprises the provision of a gear train intermediate the two roll stands. In such constructions, however, the length of the gear faces plus the length of the necks and the wobblers required for driving the same, is such that the distance between the centers of the roll stands is increased to such an extent as to make the transfer of metal from the rolls of one stand to the rolls of the other stand a difficult operation.

In other cases it has been proposed to drive the top roll of the roughing stand by a separate motor of comparatively low horse power. The difficulty of mounting this motor, together with the difficulty of accurately controlling the same, makes this construction generally undesirable.

In still other cases, an effort has been made to provide a driving connection which will permit the desired speed variation of the upper roll of the roughing stand without interfering with the operation of the mill. The attainment of this result has been attempted by the provision of a chain drive and clutch connection intermediate the rolls, but it has been found that the operation of the clutch has not been satisfactory.

By the present invention, the objections to existing constructions are obviated, while maintaining the advantages of a balanced mill of the type ordinarily used.

Referring more particularly to the drawings, there are illustrated more or less diagrammatically, the rolls 2 of the roughing stand and the rolls 3 of the finishing stand. It will be understood that these rolls are mounted in any well known manner, the upper rolls being balanced as is customary in the art.

For effecting a uniform drive between the lower rolls 2 and 3 of the respective stands, there may be provided a spindle 4 journaled in suitable bearings in a floating housing 5. This housing is slightly modified from the usual standard construction, and comprises lugs 6 projecting therefrom. These lugs are adapted to be yieldingly supported from standards 7 of suitable construction projecting upwardly from the shoe plates 8.

The desired support for the floating housing may be conveniently obtained by the use of tension rods 9 extending through the lugs 6 and the standards 7 and surrounded by compression springs 10 abutting at one end against the standards 7 and at their opposite ends against adjustable followers 11. It will be apparent that by reason of this construction the springs may be placed under the desired load to maintain the parts in the proper operating pos ons.

The ends of the spindle 4 may be formed, as is customary in this art, to provide a wobbler joint cooperating with the couplings 12, which are movable endwise over the ends of the rolls. This construction permits the necessary relative movement between the respective rolls and between each of the rolls and the housing 5.

Secured to the spindle 4 within the floating housing is a gear 13 which is adapted to drive a ring gear 14 provided with an inwardly projecting friction flange 15. This gear is frictionally engaged between the opposed friction faces 16, one of which is carried by the sleeve 17 journaled within the floating housing 5 at one end, and the other of which is carried by the sleeve member 18 telescopically mounted with respect to the sleeve 17 and journaled in the opposite side of the housing 5. The respective sleeves 17 and 18 may be provided with interengaging keys 19 providing the desired driving relationship therebetween, and may be held in cooperative frictional engagement with the flange 15 by a compression spring 20. This frictional driving connection permits movement of the gear 14 independently of the sleeves 17 and 18 under certain load conditions, while insuring the desired driving relationship between the rolls when a sheet bar is not being operated upon.

The movement of the gear 14 is in turn transmitted to the top roll 2 in the roughing stand through a suitable driving connection 21 having a universal driving engagement within the sleeve 17 at one end and a similar engagement within the coupling 22 at its other end.

From the foregoing it will be apparent that there is provided a compact means for driving the top roll of a roughing stand of a balanced sheet mill at all times. This advantageous result is secured without unduly increasing the distance between the centers of the adjacent roll stands, whereby all of the advantages of well known installations are retained.

I claim:

1. In a rolling mill, a two-high roughing stand, a two-high finishing stand, said stands being side by side in end-to-end relationship, a floating housing intermediate said stands, a spindle carried by said housing and connecting the lower roll of one stand with the lower roll of the other stand, and means for driving the upper roll of one of the stands from said spindle, substantially as described.

2. In a rolling mill, two stands of two-high rolls, said stands being side by side in end-to-end relationship, a floating housing intermediate said stands, a spindle carried by said housing and connecting the lower roll of one stand with the lower roll of the other stand, and means for driving the upper roll of one of the stands from said spindle, substantially as described.

3. In a rolling mill, two stands of two-high rolls, said stands being side by side in end-to-end relationship, a floating housing intermediate said stands, a spindle carried by said housing and connecting the lower roll of one stand with the lower roll of the other stand, and means for frictionally driving the upper roll of one of the stands from said spindle, substantially as described.

4. In a rolling mill, two stands of two-high rolls, said stands being side by side in end-to-end relationship, a housing intermediate said stands, a spindle journaled in said housing and connecting the lower rolls in the respective stands, a sleeve journaled in said housing, means forming a driving connection between said sleeve and the upper roll of one of said stands, and means for frictionally driving said sleeve from said spindle, substantially as described.

5. In a rolling mill, two stands of two-high rolls, a floating housing intermediate said stands, a spindle journaled in said housing and operatively connecting the lower rolls of the respective stands, a driving connection for the upper roll of one of said stands, and means for frictionally driving said connection from said spindle, substantially as described.

6. In a two-high rolling mill, a floating housing opposite one end of said mill, a spindle carried by said housing and connected to the lower roll of said mill, and means for driving the upper roll of said mill from said spindle, substantially as described.

7. In a two-high rolling mill, a floating housing opposite one end of said mill, a spindle carried by said housing and connected to the lower roll of said mill, and means for frictionally driving the upper roll of said mill from said spindle, substantially as described.

8. In a two-high rolling mill, a floating housing opposite one end of said mill, a spindle journaled in said housing and connected to the lower roll of said mill, a sleeve journaled in said housing, means forming a driving connection between said sleeve and the upper roll of said mill, and means for frictionally driving said sleeve from said spindle, substantially as described.

9. In a two-high rolling mill, a floating housing opposite one end of said mill, a spindle journaled in said housing and connected to the lower roll of said mill, a driving connection for the upper roll of said mill, and means for frictionally driving said connection from said spindle, substantially as described.

In testimony whereof I have hereunto set my hand.

FLORENCE C. BIGGERT, Jr.